United States Patent Office 3,702,301
Patented Nov. 7, 1972

3,702,301
RICE OIL-CONTAINING COMPOSITION FOR USE AS CUTTING, PENETRATING OR LUBRICATING OIL
Eual E. Baldwin, P.O. Box 69, Alice, Tex. 78332
No Drawing. Continuation-in-part of application Ser. No. 707,288, Feb. 21, 1968. This application Apr. 15, 1971, Ser. No. 134,482
Int. Cl. C10m 1/26, 1/50
U.S. Cl. 252—56 S   8 Claims

ABSTRACT OF THE DISCLOSURE

Rice oil derived from whole grain rice is employed according to the present invention as a cutting, penetrating or lubricating oil. Optionally, the whole grain rice oil of the present invention can be de-waxed and blended with other active ingredients such as white mineral oil, dibasic esters of sebacic acid and oleic acid of a low titer to give superior compositions suitable for use in the above manner as well as an additive for waxes, film forming coatings, low pour point greases and lubricating oils, and cosmetics.

---

This application is a continuation-in-part of application Ser. No. 707,288, filed Feb. 21, 1968.

The present invention relates to rice oil-containing compositions having particular utility as or in the formulation of lubricants, penetrating oil and cutting oil.

Rice oil-containing compositions proposed heretofore have utilized the rice oil extract of rice bran derived from the wet-milling of brown rice. However, these prior rice oil-containing compositions have not achieved the degree of lubricity and penetration which makes them highly satisfactory where high lubrication and/or penetration are important. The present invention provides a class of compositions, having general utility of lubricants, characterized by greatly increased lubricity and penetration over even somewhat analogous lubricating compositions proposed heretofore.

It is an object of the present invention to provide rice oil-containing compositions for use as lubricating oils, penetrating oils and cutting oils which utilize whole grain rice oil derived from the wet milling of brown rice and the simultaneous organic, solvent, i.e., hexane, extraction of the oil from the whole grain rice.

A further object of the present invention is to provide novel whole grain rice oil-containing lubricant compositions, and the like, comprising as active components, the aforementioned whole grain rice oil together with particular proportions of white mineral oil, i.e., liquid petrolatum, a dibasic ester, such as alkyl or aryl sebacate and a minor amount of oleic acid, preferably of a low °C. titer.

Still another object of the invention is to provide rice oil-containing compositions having greatly improved lubricity, penetrating, coating, etc. properties wherein whole grain rice oil, derived by the organic solvent extraction of whole grain rice during the milling thereof and may additionally be subjected to a supplementary purification procedure to remove wax-like contaminants therefrom.

Briefly, the present invention is predicated upon the utilization as a penetrating, lubricating or cutting oil of rice oil obtained from the organic solvent wet milling of whole grain rice, i.e., that which still contains the bran layer. Rice oil of the aforementioned type which is suitable for utilization in the present invention preferably comprises rice oil derived from whole grain rice as disclosed in Pat. No. 3,261,690, granted July 19, 1966, entitled Extractive Milling of Rice in the Presence of an Organic Solvent.

The typical properties of rice oil produced by the process of the aforementioned patent is thought to be:

| | |
|---|---|
| Non-fat solids, percent by volume | Less than 1% |
| Free fatty acid, percent | 2.0–4.0 |
| Flash point | Above 300° F. |
| Moisture and volatile matter, percent | 0.5–1.0 |
| Insoluble impurities, percent | 1.0–2.0 |
| Unsaponifiable matter, percent | 2.5–4.0 |
| Saponification value | 175–195 |
| Iodine value | 95–106 |
| Specific gravity | 0.91 at 88° F. |
| Weight/gallon | 7.8 lbs./gal. |
| Color | Typical crude |

The typical composition of the fatty portion of the crude rice oil obtained above, expressed in terms of the corresponding glyceride is:

| | Percent |
|---|---|
| Lauric acid | |
| Myristic acid | 17.6 |
| Palmitic acid | |
| Stearic acid | |
| Oleic acid | 47.6 |
| Linoleic | 34.0 |
| Linolenic | 0.8 |
| | 100.0 |

The free fatty acid content of the aforementioned crude rice oil is thought to be:

| | Percent |
|---|---|
| Lauric acid | |
| Myristic acid | 17.6 |
| Palmitic acid | |
| Stearic acid | |
| Oleic acid | 47.6 |
| Linoleic | 34.0 |
| Linolenic | 0.8 |
| | 100.0 |

The insoluble impurities, non-fat solids, and unsaponifiable matter is generally thought to comprise:

Melissyl protein fraction:

| Amino acids: | Percent |
|---|---|
| Threonine | 3.5 |
| Alanine | 6.0 |
| Valine | 5.3 |
| Methionine | 1.7 |
| Isoleucine | 3.7 |
| Leucine | 7.3 |
| Phenylalanine | 4.4 |
| Tryptophane | 0.8 |
| Lysin | 4.9 |
| Histidine | 3.0 |
| Unidentifiable nitrogenous compounds | 59.5 |
| | 100.0 |

From a consideration of the foregoing, it must again be emphasized that the aforementioned whole grain rice oil should not be confused in any way with oil obtained by the extraction of the bran layer of rice. In this regard, the primary difference is considered to be that the whole grain rice oil contains more melissyl cerotate and the protein fraction contains a high percentage of unidentifiable nitrogenous compounds. Further, the whole grain rice oil is not affected by enzymatic activity making it quite stable at high temperatures and wherein the absence of enzymatic activity substantially eliminates the hydrolysis of the glyceride fraction of the oil, i.e., the triglyceride fraction comprising the aforementioned three unsaturated fatty acids.

The aforementioned crude whole grain rice oil contains waxy compounds which may be undesirable in rice oil-containing compositions produced in accordance with the present invention. Although the exact chemical composition of this undesirable wax-like fraction has not yet been established, it is theorized to be nitrogen-containing and has one or more or a combination of amine and amide linkages. It is an additional feature of the present invention that it has been found that these compounds in the crude whole grain rice oil can be removed by various processes, such as, for example, a "modified wintering process," which entails storage of the crude whole grain rice oil for a prolonged period of time at low temperature followed by mechanical removal of material precipitated by the wintering process to give a refined grade of whole grain rice oil suitable for use in the rice oil-containing compositions of the present invention. Normally, the wintering process of the crude whole grain rice oil is accomplished in a storage vessel having a very great height to diameter ratio. The period of time the oil is permitted to remain in the storage vessel is a function of both the temperature of the oil as well as the desired degree of purity of the refined oil, i.e., the percentage of undesirable compounds removed by the modified wintering process. Normally, approximately 90% of the undesirable compounds can be removed by storage of the crude whole grain rice oil in a vessel of the aforementioned type, which is maintained at a temperature of approximately 40° F. in a quiescent state for a period of approximately 1 month. Subsequent to such storage, the bottom layer, within which is entrained the undesirable impurities, can be separated from the relatively pure supernatant by a suitable mechanical means, i.e., decanting of the supernatant after which the relatively impure bottom layer is passed through a conventional solids-liquid separation apparatus, i.e., a centrifugal separator, and the additional relatively pure oil recovered added to the aforementioned supernatant.

Alternatively, other suitable procedures can be employed for the removal of waxes from the rice oil, such as, for example, filtering either with or without the aid of a vacuum. When the filtering procedure is used, it may be facilitated by first heating the oil to about 90°–200° C. and then allowing to cool. In fact, where the oil is allowed to stand for a prolonged period, say about 24–48 hours subsequent to such heating, a separation occurs with most of the waxes settling to the bottom. Accordingly, the de-waxed oil can readily be decanted from the wax.

In another optional procedure of the present invention, it has been found that separation of oil and wax is facilitated by heating to 90°–240° C. and adding about .1–.5% by volume, based on the oil of acetic anhydride. On cooling, the wax then readily separates at an accelerated rate.

In still another procedure for separating waxes and oil, the oil can be diluted with low boiling distillates to enhance the speed of filtration. Subsequent to filtering, these distillates can then be evaporated off and recovered for reuse.

As indicated hereinabove, the rice oil-containing compositions contemplated by the present invention may also include particular proportions of white mineral oil, dibasic esters of sebacic acid and oleic acid, preferably of a low titer.

Although it is not desired to be limited in this respect suitable white mineral oils, i.e., liquid petrolatums, comprise the following Sontex white oils manufactured by Mineral Oil Refining Co. of Dickinson, Texas, characterized by the following typical properties and hydrocarbon composition:

|  | Viscosity SUS at 100° F. | Specific gravity, 77° F. | Flash, ° F. | Pour, ° F. | Hydrocarbon composition | | |
|---|---|---|---|---|---|---|---|
|  |  |  |  |  | Molecular weight | Percent | |
|  |  |  |  |  |  | Naphthenes | Paraffins |
| Sontex: |  |  |  |  |  |  |  |
| 37 | 360/380 | 0.860/0.905 | 430 | −30 | 433 | 40.5 | 59.5 |
| 70 | 65/75 | 0.855/0.865 | 330 | −60 | 298 | 42.0 | 58.0 |
| 50 | 48/52 | 0.820/0.828 | 325 | +10 | 263 | 25.4 | 74.6 |
| 7030 | 70/80 | 0.855/0.865 | 325 | −60 | 306 | 42.5 | 57.5 |
| 75T | 70/80 | 0.835/0.845 | 350 | −5 | 319 | 34.0 | 66.0 |

Dibasic esters exemplary although suitable for the practice of the present invention have been found to include:

|  | Specific gravity, 20/20° C. ±.003 | Viscosity, 25° C., cps. |
|---|---|---|
| Dibenzyl sebacate | 1.055 (30/20° C.) | {21–22 at 30° C. / Solid at 25° C. |
| Dibutyl sebacate | 0.937 | 7.9. |
| Dimethyl sebacate | 0.986 (30/20° C.) | $3.54 at 30° C. |
| Dioctyl sebacate | 0.915 | {Solid at 25° C. / 17.4. |

Suitable proprietory oleic acids are preferably, although not necessarily, characterized by the following:

| Titre, ° C. | Maximum color (Lovibond) | Iodine value (Wlls.) | Percent F.F.A. (as oleic), min. | Acid value | Sap. value | Unsap. (max.), percent |
|---|---|---|---|---|---|---|
| 6–10 | 10.0 Y/2.0 R (1″) | [1] 93 | 99 | 197–203 | 197–203 | 1.5 |
| 5 maximum | 10.0 Y/2.0 R (1″) | [1] 95 | 99 | 197–202 | 197–203 | 1.5 |

[1] Maximum.

The following table is included to specifically illustrate an examplary de-waxed whole grain rice oil-containing composition formulated in accordance with the present invention, further showing the operative lower and upper concentrations of the active components of the compositions contemplated by the present invention.

| Component | Weight percent | Limits over which concentrations may be varied (weight percent) | |
|---|---|---|---|
| De-waxed whole grain rice oil | 75 | 5 | 95 |
| White mineral oil | 15 | 1 | 75 |
| Dibasic esters of sebacic acid | 5 | 0.1 | 50 |
| Oleic acid | 5 | 0.1 | 10 |

In interpreting the above table, it will be understood that the white mineral oil may comprise a single white mineral oil or an admixture of two or more white mineral oils. In addition, the dibasic esters of sebacic acid may for example comprise one or more dibasic esters selected from a group of dibenzyl sebacate, dibutyl sebacate, dimethyl sebacate and dioctyl sebacate. The oleic acid also will be understood to preferably be one of a low titer, i.e., in the order of 5 to 10° C. maximum.

The rice oil-containing compositions of the present invention have been found to have particular utility as penetrating oils, lubricant and cutting oils. In this regard, it has been noted that the compositions of the present invention are characterized by numerous desirable properties. For example, they possess a low surface tension on the order of 14 to 21 dynes/cm.$^2$.

It has even been noted that when not properly contained a composition will actually "climb" upwardly over the upper edge of a storage vessel and down the outside if the vessel is too full. The instant compositions are classifiable as non-flammable in accordance with the most recent U.S. Government regulation concerning packaging of consumer products and consistent with this the compositions withstand high temperatures for prolonged periods of time without showing evidence of any significant degradation, which is also true of the compositions after considerable periods of time at ambient temperatures. In addition, the compositions after extended storage or use do not develop gummy deposits, thus as indicated hereinabove, the compositions as tabulated above provide a non-drying thin film lubricant coating, which is considered to approach a monomolecular film, of excellent lubricity which is not significantly affected by either fresh or saline water. Mild steel test panels coated with the present compositions have been submerged in salt water, of a saline content comparable to seawater, for prolonged periods of time without any significant evidence of corrosion thereof. In addition, other mild steel panels coated with the compositions have been submerged in water, buried in mud, suspended in an atmosphere saturated with dust, buried in sand and have been found not to contain any significant evidence of rust. Furthermore, the rice oil-containing compositions formulated in accordance with this invention have been found to have excellent penetrating properties whereby they are highly useful for the loosening of rust and scale deposits formed on metal surfaces. It has also been observed that the compositions will penetrate polytetrafluoroethylene, epoxy, and numerous coating materials of both synthetic as well as natural composition.

With further regard to the aforementioned properties and utilities, the rice oil-containing compositions formulated in accordance with the present invention have been found to be highly suitable for use in the gear case units of outboard marine engines, and bench tests have shown that a 5-horsepower electric motor loaded to capacity with the use of normal oil when relubricated by the utilization of the compositions of the present invention increase the capacity of the motor by 100 r.p.m. Tests conducted in conjunction with the utilization of the compositions of the present invention as a cutting oil have shown that it effects significant economies by reducing the wear on cutting tools, prolonging the tools' life by one-half, reducing man hours required for sharpening tools by one-half, and resulting in a finished machined surface which is 25% smoother in addition to facilitating the machining of material such as stainless steel, for example, which is normally rather difficult to handle in precision machining operations. Utilization of the composition of the present invention for the lubrication of high precision devices, i.e., watches, guns, have shown that the compositions due to their aforementioned highly desirable properties are extremely well suited thereto. Furthermore, the compositions of the present invention can be utilized to permanently blue gun barrels and the like by heating a gun barrel coated with the compositions. Still further, laboratory evaluations as well as limited use in miniature heat exchange equipment has shown that the compositions of the present invention are highly suitable for use as heat transfer mediums. Although not specifically mentioned heretofore, from the foregoing, it will be readily apparent that the utilization of the compositions of the present invention in conjunction with guns is highly advantageous inasmuch as the compositions solvate carbon deposits generated by the gun powder.

In addition to the multitude of utilities set forth hereinabove the compositions of the present invention can be advantageously utilized as additives for numerous compositions ranging from cosmetic preparations, i.e., shampoo, bath oil, to surf board, water ski and boat waxes, drying coatings for metallic members, greases, water pump lubricant and the like.

In the case of formulating a drying coating for metallic surfaces utilizing the rice oil-containing composition set forth herein a very thin hard drying film can be obtained on the metallic surfaces by the adjustment of the pH. Furthermore, greases are obtained by adding the composition of the present invention to silicas and/or metal soaps. With regard to the film forming capabilities of the modified composition of the present invention adjustment of the pH to a range of approximately 6.5 to 2.0, which results in the formulation of a suitable film forming coating composition. Acidic materials utilized to adjust the pH may be organic and/or inorganic in nature. Examples of these are phosphoric acid, acetic acid, nitric acid, acetic anhydride and sulfamic acid. Conventional chemical laboratory methods are used for the pH determinations of these non-aqueous systems, that is by extraction with distilled water or by dissolving it in methanol followed by the addition of water and subsequently determining the pH of these aqueous systems.

As pointed out above, the whole grain rice oil of the present invention has been found to have particular advantages when employed in various cosmetic preparations such as, for example, shampoos and bath oils. For example, a mixture of the whole grain rice oil of the present invention and paraffin oil can be sulfated or saponified to obtain a product which may be employed as a non-foaming shampoo or employed without sulfation or saponification as a skin oil or in solid emulsions in the form of cold creams, shaving creams, and other cosmetic preparations. United States Patent No. 2,336,166 to Davis discloses procedures by which these cosmetic preparations may be formulated using rice bran oil rather than the de-waxed whole grain rice oil of the present invention.

It is yet another feature of the present invention that the rice oil of this invention can be combined in amounts of 20%–95% by weight, preferably about 50% by weight with about 1%–40%, preferably about 25% with each of fluoro-trichloro methane and dichloro-difluoro methane to give an aerosol which can be employed as a very fast acting penetrating oil. Unexpectedly in this aerosol containing the rice oil of the present invention, it has been found that both the fluoro-trichloro methane and the dichloro-difluoro methane are infinitely soluble in the de-waxed whole grain rice oil and, in addition, since these compounds are very volatile and have low surface tensions, an oil having very fast penetration is obtained.

According to the present invention, various greases having non-hardening, waterproof, and anti-corrosive properties can be formulated by combining about 75%–95% by weight, preferably about 88% by weight, de-waxed whole grain rice oil with about 1% to 15% by weight, preferably about 8%, pyrogenic silica. Optionally up to about 10% and preferably about 2% by weight of each of 12-hydroxy stearic acid or stearic acid can also be added to this grease composition.

Silicone containing lubricating and penetrating oils as well as corrosion inhibitors can be formulated from whole grain rice oil of the present invention also. These silicone containing compositions contain about 75%–99.8% by weight, preferably 95% by weight whole grain rice oil and from about 0.2% to 50% by weight, preferably about 5% by weight of an organo-silicone copolymer or mixture of copolymers having high water repelency lubricity, oxidation resistance and low surface tension. Suitable organo-silicone polymers for example have viscosities of about 100–150 cs. at 25° C., surface tensions of about 21 to 25 dynes/cm., and specific gravities at 25° C. of about .99–1.10.

A water soluble cutting oil is formulated from the whole grain rice oil of the present invention by combining about 82.5% by weight to about 98.5% by weight, preferably about 96.5% by weight of this oil with about .75% by weight to about 7.5% by weight preferably about 1.5% by weight of a polyoxyethylene polyol fatty acid ester surfactant and about 1%–10% by weight, preferably about 2.0% by weight polyoxyethylene sorbitan mono-oleate. Alternatively about 87.5% to 99% by weight, preferably about 97.5% by weight whole grain rice oil can be combined with about .75% to 7.5% by weight, preferably about 1.5% by weight of a polyoxyethylated vegetable oil instead of the fatty acid ester thereby permitting the amount of polyoxyethylene sorbitan mono-oleate to be reduced by half.

In yet another embodiment of the present invention, 60% to 95% by weight whole grain rice oil, preferably about 75% can be combined with 1% to 15% by weight, preferably about 8% pyrogenic silica, and about 0.1% to 25% by weight, preferably about 17% by weight polytetrafluoroethylene resin to produce a grease having superior lubricating properties.

In view of the foregoing, it will be readily apparent to those of ordinary skill in the art to which this invention pertains that changes may be made in the proportions and selection of various active components combined with the whole grain rice oil as disclosed without departing from the spirit of the invention. Accordingly, it is intended that the invention be limited only by the scope of the appended claims.

What is claimed as new is as follows:

1. A lubricating composition comprising, on the basis of weight, 5% to 95% whole grain rice oil obtained from the organic solvent wet milling of whole grain rice, 1% to 75% white mineral oil, 0.1% to 50% of at least one dibasic ester of sebacic acid and 0.1% to 10% oleic acid.
2. The lubricating composition of claim 1 wherein said whole grain rice oil is de-waxed whole grain rice oil.
3. The lubricating composition of claim 1 wherein said at least one dibasic ester of sebacic acid is selected from the group consisting of dibenzyl sebacate, dibutyl sebacate, dimethyl sebacate and dioctyl sebacate.
4. The lubricating composition of claim 1 comprising 75% whole grain rice oil, 15% white mineral oil, 5% dibasic ester of sebacic acid and 5% oleic acid.
5. The lubricating composition of claim 1 wherein the titer of said oleic acid is 5°–10° C.
6. The lubricating composition of claim 3 wherein said dibasic ester is dibutyl sebacate.
7. The lubricating composition of claim 1 wherein said whole grain rice oil is winterized whole grain rice oil.
8. The lubricating composition of claim 1 further including a grease-forming additive selected from the group consisting of silicas and metal soaps.

References Cited
UNITED STATES PATENTS

| | | | |
|---|---|---|---|
| 2,180,256 | 11/1939 | Printon | 252—56 R |
| 3,032,504 | 5/1962 | Doelling et al. | 252—79 |
| 2,619,421 | 11/1952 | Greenfield | 260—428.5 |
| 3,261,690 | 7/1966 | Wayne | 99—80 PS |
| 2,134,736 | 11/1938 | Reuter | 252—56 R |
| 1,929,189 | 10/1933 | Ott | 252—56 R |
| 1,319,129 | 10/1919 | Wells et al. | 252—56 R |

Koyama, Chemical Abstracts, vol. 47 (1953), p. 800.

Cohen, Modern Textiles Magazine, vol. 46, No. 6 (1965), pp. 61–64.

Feuge et al., Chemical Abstracts, vol. 43 (1949), p. 6842.

Hilditch et al., "The Chemical Constitution of Natural Fats," 4th ed. (1964), Wiley & Sons, New York, pp. 270, 280, 282 and 283.

DANIEL E. WYMAN, Primary Examiner

W. H. CANNON, Assistant Examiner

U.S. Cl. X.R.

252—28, 49.5, 56 R